United States Patent
Schuck (10) Patent No.: US 10,097,800 B2
(45) Date of Patent: Oct. 9, 2018

(54) OPTICAL LENS SYSTEMS WITH DYNAMIC IRIS FOR MODULATING IMAGE FRAMES

(71) Applicant: ReaID Inc., Beverly Hills, CA (US)

(72) Inventor: Miller H. Schuck, Erie, CO (US)

(73) Assignee: ReaID Inc., Beverly Hills, CA (US)

( * ) Notice: Subject to any disclaimer, the term of this patent is extended or adjusted under 35 U.S.C. 154(b) by 199 days.

(21) Appl. No.: 15/151,376

(22) Filed: May 10, 2016

(65) Prior Publication Data

US 2016/0334696 A1    Nov. 17, 2016

Related U.S. Application Data

(60) Provisional application No. 62/159,614, filed on May 11, 2015.

(51) Int. Cl.
*G02B 23/24* (2006.01)
*H04N 9/31* (2006.01)
(Continued)

(52) U.S. Cl.
CPC ....... *H04N 9/3111* (2013.01); *G02B 13/0095* (2013.01); *G02B 13/16* (2013.01);
(Continued)

(58) Field of Classification Search
CPC .. G02B 5/005; G02B 13/001; G02B 13/0055; G02B 13/0075; G02B 27/18; G03B 7/00;
(Continued)

(56) References Cited

U.S. PATENT DOCUMENTS

| 5,414,460 A * | 5/1995 | Niertit | G03B 9/06 348/363 |
| 7,220,006 B2 * | 5/2007 | Allen | H04N 9/3155 348/744 |

(Continued)

FOREIGN PATENT DOCUMENTS

| JP | 2009-265120 A | 11/2009 |
| WO | 2013010167 A2 | 1/2013 |

OTHER PUBLICATIONS

International search report and written opinion of international searching authority in co-pending PCT/US2016/031669, dated Jul. 27, 2016.

(Continued)

*Primary Examiner* — Arnel C Lavarias (74) *Attorney, Agent, or Firm* — Penny L. Lowry; Neil G. Mothew (57) ABSTRACT

A dynamic iris is located on the imaging path of an optical lens system that includes a relay lens system and at least one projection lens system. A dynamic iris modulates image frames in an image data stream, resulting in a reduction in light transmission associated with the modulated image frames. A dynamic iris may be configured to change the size of its aperture as fast as or faster than the image frame period of the image data stream, and may be located at or near the pupil of a relay lens system, a projection lens system, or both. A second dynamic iris in the imaging path further modulates the image frames, resulting in a further reduction in light transmission. A dynamic iris may modulate an image frame based on an electronic preview of the image frame or based on metadata associated with the image frame.

20 Claims, 6 Drawing Sheets

(51) Int. Cl.
*G02B 13/00* (2006.01)
*G02B 13/16* (2006.01)
*G02B 27/26* (2006.01)
*H04N 5/20* (2006.01)
*G02B 27/28* (2006.01)

(52) U.S. Cl.
CPC ............... *G02B 27/26* (2013.01); *H04N 5/20* (2013.01); *H04N 9/3182* (2013.01); *G02B 27/283* (2013.01); *G02B 27/286* (2013.01)

(58) Field of Classification Search
CPC ... G03B 7/18; G03B 9/00; G03B 9/02; G03B 9/04; G03B 9/06; G03B 9/07; G03B 9/08; G03B 9/10; G03B 21/14; G03B 21/142
USPC ..... 359/227, 230, 231, 232, 483.01, 489.01, 359/489.08, 489.09, 489.15, 738, 739, 359/740; 353/7, 8, 20, 39, 75, 81, 88, 97
See application file for complete search history.

(56) References Cited

U.S. PATENT DOCUMENTS

| 7,857,455 | B2 | 12/2010 | Cowan et al. |
| 7,905,602 | B2 | 3/2011 | Schuck et al. |
| 8,727,536 | B2 | 5/2014 | Schuck et al. |
| 9,244,287 | B2 | 1/2016 | Schuck |
| 9,854,212 | B2* | 12/2017 | Schuck ................ H04N 9/3152 |
| 2005/0270618 | A1 | 12/2005 | Uchiyama et al. |
| 2007/0263179 | A1 | 11/2007 | Katsuragawa et al. |
| 2007/0279595 | A1 | 12/2007 | Magarill |
| 2010/0097577 | A1* | 4/2010 | Chung ................... G02B 5/005 353/18 |
| 2014/0253879 | A1 | 9/2014 | Schuck et al. |
| 2015/0138508 | A1 | 5/2015 | Sharp et al. |

OTHER PUBLICATIONS

Murdoch et al., "Veiling glare and perceived black in high dynamic range displays", J. Opt. Soc. Am. A., vol. 29:4, Apr. 2012.

Pavlovych et al., "A High-Dynamic Range Projection System", Photonic Appl. in Biosensing and Imaging, SPIE vol. 6969, Sep. 2005.

Seetzen et al., "High dynamic range display systems", ACM Transactions on Graphics, 23:3, 2004.

Seetzen et al., "High dynamic range display using low and high resolution modulators", SID International Symposium Digest, 54:2, 2004.

* cited by examiner

OPTICAL LENS SYSTEMS WITH DYNAMIC IRIS FOR MODULATING IMAGE FRAMES

CROSS-REFERENCE TO RELATED APPLICATIONS

This application claims priority to U.S. Patent Appl. No. 62/159,614 entitled "High dynamic range, high contrast projection systems" filed May 11, 2015, which is herein incorporated by reference in its entirety.

TECHNICAL FIELD

This disclosure relates generally to high dynamic range (HDR) optical systems, and more particularly to high dynamic range projection with dynamic iris.

BACKGROUND

Dynamic range describes the ratio of maximum-to-minimum luminance detected by a sensor, for example the eye, or presented by a display, for example a projector. The long-term dynamic range of the human eye spans many orders of magnitude, and exceeds the dynamic range of typical projection systems. The instantaneous dynamic range of the human eye is limited by intra-ocular reflections and scattering ("*Veiling glare and perceived black in high dynamic range displays*," M. Murdoch and I Heynderickx, J. Opt. Soc. Am. A, Vol. 29, No. 4, April 2012); yet this often exceeds the instantaneous dynamic range of a projector. For higher perceived image quality, it is desirable to implement display devices with dynamic ranges approaching the limits of the human eye.

BRIEF SUMMARY

Disclosed herein are embodiments of an optical lens system having an imaging path. The optical lens system may include a relay lens system in the imaging path. The relay lens system may be configured to receive a sequence of image frames in an image data stream having an image frame period. The optical lens system may also include a projection lens system in the imaging path. The projection lens system may be configured to receive the image data stream from the relay lens system. The optical lens system may also include a dynamic iris in the imaging path. The dynamic iris may have a circular shape, an elliptical shape, a rectangular shape, or some other shape. The dynamic iris may be configured to change the size of its aperture as fast as or faster than the image frame period to modulate the image frames in the image data stream, resulting in a reduction in light transmission associated with the modulated image frames. A dynamic iris may be located within a relay lens system, within a projection lens system, or both. A second dynamic iris in the imaging path may be configured to further modulate the image frames, resulting in a further reduction in light transmission. A dynamic iris may be located at or near a pupil of the lens system. A dynamic iris may modulate an image frame based on an electronic preview of the image frame, based on metadata associated with the image frame, or based on some other criteria.

Also disclosed herein are embodiments of a polarization conversion system. The polarization conversion system may include a first lens system on an initial light path. The first lens system may be configured to receive a sequence of image frames in an image data stream having an image frame period. The polarization conversion system may also include a light splitting element configured to receive the image data stream as randomly polarized image light from the first lens system, to direct light with a first polarization state along a first light path, and to direct light with a second polarization state along a second light path. The polarization conversion system may also include a reflecting element located on the second light path and configured to receive light from the light splitting element. The polarization conversion system may also include a polarization rotator element located on the second light path and configured to receive reflected light from the reflecting element.

The polarization conversion system may also include a second lens system configured to receive the image data stream on the first light path from the light splitting element. The polarization conversion system may also include a third lens system configured to receive the image data stream on the second light path from the polarization rotator element. The polarization conversion system may also include a dynamic iris located on any or all of the initial light path, the first light path, and the second light path. The dynamic iris may be configured to change the size of its aperture as fast as or faster than the image frame period to modulate the image frames in the image data stream, resulting in a reduction in light transmission associated with the modulated image frames. A dynamic iris may be located within any or all of the first, second, and third lens systems.

BRIEF DESCRIPTION OF THE DRAWINGS

Embodiments are illustrated by way of example in the accompanying figures, in which like reference numbers indicate similar parts, and in which.

DETAILED DESCRIPTION

Dynamic range describes the ratio of maximum-to-minimum luminance detected by a sensor, for example the eye, or presented by a display, for example a projector. The long-term dynamic range of the human eye spans many orders of magnitude, and exceeds the dynamic range of typical projection systems. The instantaneous dynamic range of the human eye is limited by intra-ocular reflections and scattering ("*Veiling glare and perceived black in high dynamic range displays*," M. Murdoch and I Heynderickx, J. Opt. Soc. Am. A, Vol. 29, No. 4, April 2012); yet this often exceeds the instantaneous dynamic range of a projector. For higher perceived image quality, it is desirable to implement display devices with dynamic ranges approaching the limits of the human eye.

In projection systems, the dynamic range can be described on a longer-term frame-to-frame basis, which may be referred to as inter-frame or sequential contrast, and on an instantaneous single-frame basis, which may be referred to as intra-frame, checkerboard, or ANSI contrast.

The sequential contrast of a projection device is determined by displaying a full-frame white image, measuring its luminance, and comparing it to the luminance of a full-frame black image. Typical sequential contrast ratios for digital cinema projectors are 2000:1. The sequential contrast of projection display is limited by the leakage of light from the illumination optics into the imaging optics when the display panel is in the dark state. For Digital Light Processing (DLP)-based projectors, this includes light reflected from the mirror hinges and edges, light scattered from glass materials, surfaces and coatings, and light reflecting or scattering from mechanical features. For Liquid Crystal on Silicon (LCOS)-based systems, this includes light leakage due to imperfect polarization states and similar interactions between light, glass and mechanical features as in the DLP system. Since the leakage from the panel dark state represents the lowest light output of the projector, the projector's sequential contrast is, in most cases, about equal to the projector's dynamic range.

Intra-frame contrast, which may be referred to as checkerboard or ANSI contrast, is determined by locating equal sized black and white rectangles within a single frame, and measuring the ratio of luminance in the white squares relative to the black squares. The intra-frame contrast is generally lower than sequential contrast, as multiple reflections and scattering of light from the white rectangles adds to the sequential leakage in the dark rectangle areas. Typical intra-frame contrast ratios for digital cinema projectors can vary from 100:1 to 500:1, depending on the cleanliness and quality of the imaging optics.

For images with high gray-level or high IRE pixels, intra-frame contrast limits the perceived quality of the projected image. Light from the bright pixels tends to pollute the dark areas. For images with low gray-level or low IRE pixels, the sequential leakage limits the perceived image quality. Stated differently, variations in the image black levels may be "crushed" or reduced to unnoticeable differences.

Figure 1:
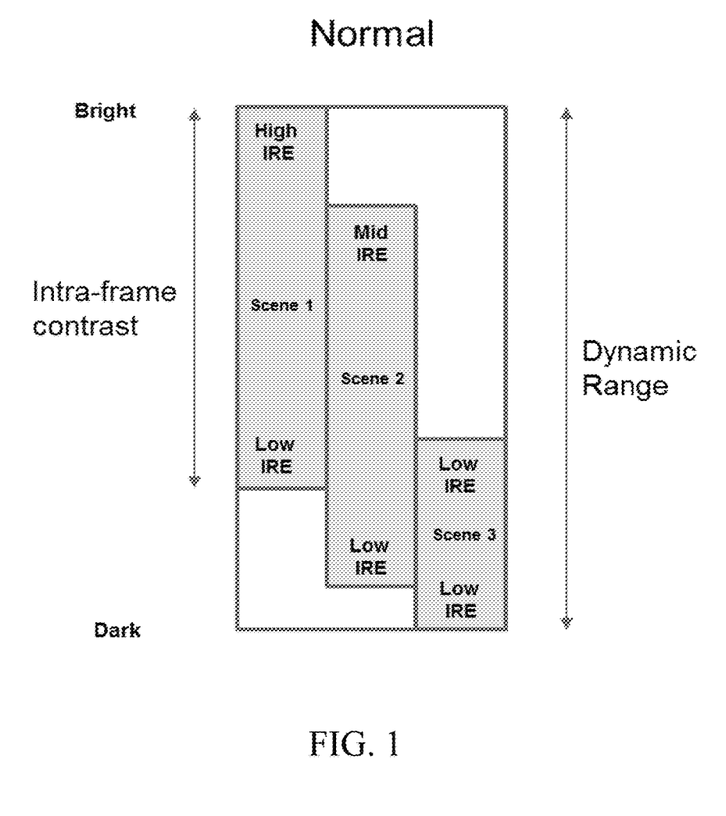
FIG. 1 is a schematic diagram illustrating dynamic range, intra-frame contrast for a typical projector.

FIG. 1 depicts the dynamic range and intra-frame contrast for a typical projector. As illustrated in FIG. 1, intra-frame contrast or within-frame contrast may have high IRE pixels and in this example, the intra-frame contrast may lower the quality of the projected frame. Additionally, the dynamic range may have low IRE pixels and in this example, the high dynamic range or frame-to-frame contrast may lower the quality of the sequentially projected frames.

In an effort to improve dynamic range and intra-frame contrast, an optical device can be inserted into the projector optical path to more precisely control the illumination reaching the screen. The optical device may work in concert with signal conditioning of the input data to improve dynamic range and intra-frame contrast while maintaining the artistic intent of the content. Examples include U.S. Pat. No. 7,220,006 to Allen et al, and "A High-Dynamic Range Projection System," by A. Pavlovych and W. Stuerzlinger, Photonic Applications in Biosensing and Imaging, SPIE vol. 5969, ISBN 081945988-7, September 2005. It is also possible to use a simplified scheme in which the input data are not modified. In this case, the dark regions of the image are simply darkened further to improve the perception of contrast. The resulting reduction in fidelity is, at least partially, tolerated by the visual system.

Such an optical device may be located at several points in a projection system: 1) at a field position, or at the display or a conjugate image plane of the display; 2) at a pupil position, for example in the illumination optics or relay and/or projection lens aperture stops; or 3) at a position between a field and a pupil, for example, outside the exit surface of a projection lens. An optical device placed at a field position operates spatially on the image, either as a global modulation of the entire image or as a pixelated modulation of the image. For pupil position implementation, an optical device typically operates globally on the entire image by reducing the amount of light through the pupil at appropriate times. If the pupil modulator could modulate light based on incidence angle, then a more pixelated modulation would result. Devices located between pupil and field positions may account for both the angular and spatial nature of the unformed image.

A system described in "A High-Dynamic Range Projection System," by A. Pavlovych and W. Stuerzlinger ("A high-dynamic range projection system," by A. Pavlovych and W. Stuerzlinger, www.cs.yorku.ca/~{andriyp, wolfgang}) locates a modulator, in this case, a liquid-crystal display (LCD), at a field position. The field position is an intermediate image plane generated by adding a relay lens after a projection lens. The relay forms a real image of a DLP panel at the LCD. An objective follows the LCD to re-project the image to the screen. The LCD absorbs a large portion of the unpolarized light from the projector, and is therefore inefficient (approximately 15% transmissive).

A system described in "High dynamic range display systems," by H. Seetzen et al, ("High dynamic range display systems," by H. Seetzen et al, Siggraph 2004, ACM Transactions on Graphics, 23(3)), utilizes a projector as a backlight for an LCD. The projector provides a high brightness image, with similar resolution to the LCD, but slightly defocused to avoid moire issues, while the LCD provides a second stage of modulation. The dynamic range is reported to be the multiplication of the projector contrast and LCD contrast. In this case, the modulator is the projected real image and is located at a field or the image plane. In order to account for the slightly blurred projector image, the authors convolved the projector pixel blur function with the square root of the linear image, and divided the LCD panel image by this convolution to account for the blur.

Seetzen also describes an LED-backlight HDR display in "A high dynamic range display using low and high resolution modulators" ("A high dynamic range display using low and high resolution modulators," by H. Seetzen et al, SID International Symposium Digest, paper 54.2). In this case, the authors describe a low resolution backlight that includes high brightness LEDs arranged in an array. The LEDs are current and pulse controlled to serve as the modulator. In this case, the modulator is located at a field or image position.

Figure 2:
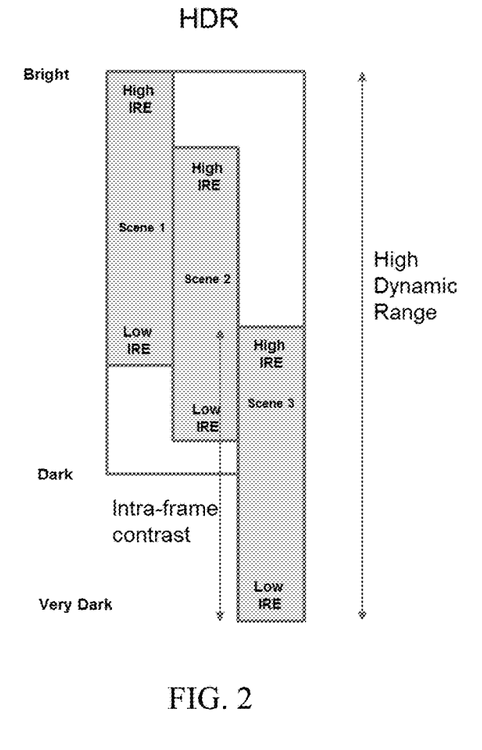
FIG. 2 is a schematic diagram illustrating dynamic range, intra-frame contrast and pixel addressing for a high dynamic range projector.

U.S. Pat. No. 7,220,006 to Allen et al, is a pupil position system, and utilizes an adjustable iris at the projection lens aperture stop to increase the sequential contrast, and therefore long-term dynamic range, of a projector. The iris size is adjusted based on the peak or average pixel IRE level measured in an image frame, while the IRE levels themselves are re-adjusted to account for the lowered lens throughput. This sort of "global" modulation can improve the intra-frame contrast at low light levels, while extending the overall system dynamic range. FIG. 2 depicts the dynamic range, intra-frame contrast, and pixel addressing for such a high dynamic range projector.

HDR projection may pertain to the display of imagery that spans the luminance range appropriate to represent a viewing experience in the natural world. For example, in outdoor scenes, specular reflections from objects illuminated by direct sunlight may be far above that provided by current projection systems. At the other end of the spectrum, objects in shadow may be displayed by employing deep black levels and dark detail that may be frequently lost in displayed imagery due to various sources of stray light. From the display perspective, the matter of enabling HDR thus may relate to advances in performance, for example the ability to simultaneously display very high local peak brightness and the ability to display extremely dark local black levels with an appropriate increase in bit depth.

Polarization-preserving stereoscopic cinema systems have been described in several patents and patent applications, for example, U.S. Pat. No. 7,905,602, U.S. Pat. No. 7,857,455, U.S. Pat. No. 8,727,536, and WO 2013010167A3, all of which are herein incorporated by reference in their entireties. Randomly polarized light from a DLP projector is split into orthogonal polarization states, re-directed and manipulated to produce matching polarization states, and overlaid on-screen for viewing. These systems may actively switch polarization states, for example with liquid-crystal switches, or use passive components in dual projector configurations, for example one projector per eye. Once the randomly polarized light is sorted into orthogonal polarization states, there is an opportunity to locate polarization-based modulators in the optical path(s) to efficiently modulate light.

Several types of HDR devices for use in several types of projection systems are described in U.S. Patent Publ. No. 2015/0138508 entitled "High dynamic range, high contrast projection systems," filed Nov. 14, 2014, which is herein incorporated by reference in its entirety.

Described herein are HDR devices utilizing a dynamic iris for use in projection systems utilizing a relay lens and projection lens in the imaging path, for example, after the display panel. A dynamic iris may change its aperture diameter in continuous or discrete steps, in a time that may be on the order of a frame period. The size of the aperture may be determined by electronically previewing the incoming data, or by utilizing extra "metadata" in the image data stream. Such HDR devices utilizing a dynamic iris may or may not be implemented with polarization preserving optics for high efficiency 3D.

2D HDR Projection

Figure 3:
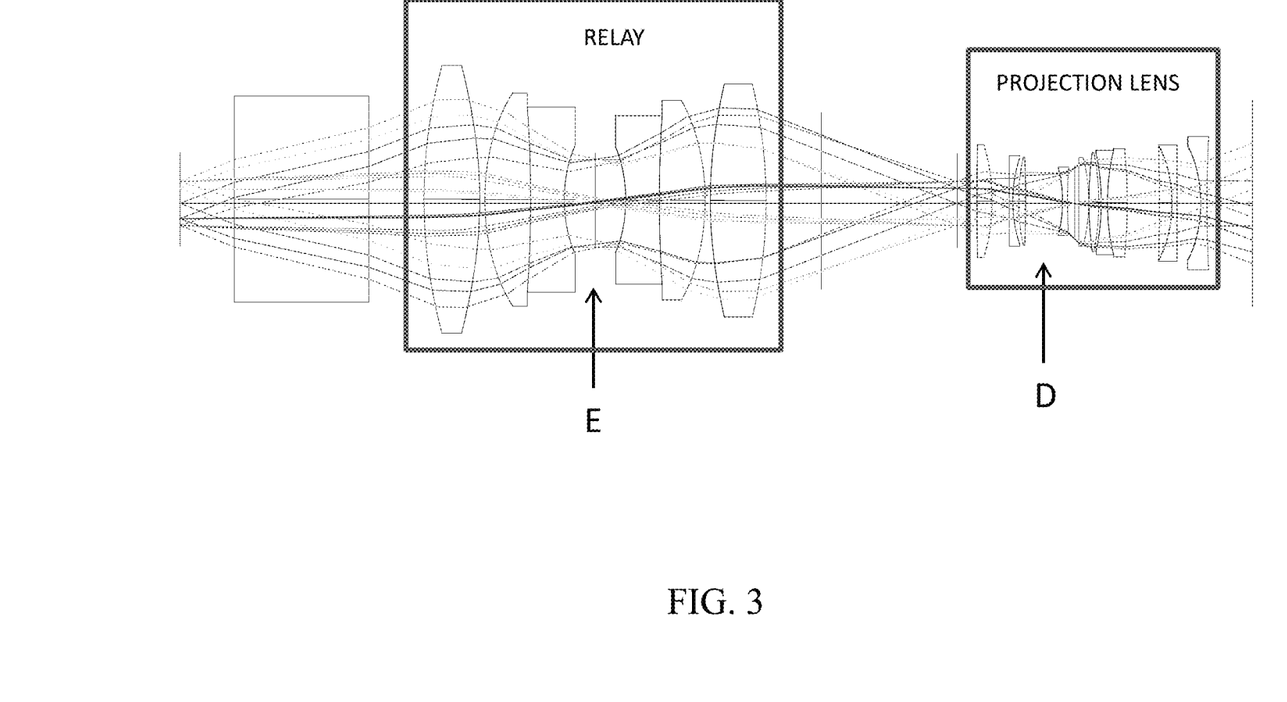
FIG. 3 is a schematic diagram illustrating dynamic iris location options for a lens system, in accordance with the present disclosure.

For non-stereoscopic viewing, a dynamic iris may be used at or near a pupil position in a relay lens system and/or a projection lens system. FIG. 3 is a schematic diagram illustrating dynamic iris location options E and D for a lens system. As illustrated in FIG. 3, location E is inside the relay lens system, and location D is inside the projection lens system. In embodiments where the projection lens is a zoom lens with a pupil that changes diameter with focal length, the dynamic iris may be positioned inside the relay lens system. In some embodiments, two dynamic irises may be used, one in the relay lens system and one in the projection lens system, for higher stray light rejection.

The transmission of the dynamic iris may be set based on the luminance intended in an image frame. The image luminance levels are readjusted to allow darker projected black levels, and to account for the lowered throughput in brighter portions of the image.

In some embodiments, the luminance levels may be inversely scaled with the reduced luminance transmitted by the dynamic iris. For a typical projection system, the luminance at each pixel in the image may be encoded according to a power-law expression, in which the code values are raised to a power other than 1, for example 2.6 in the digital cinema case. The following expression may determine the pixel luminance L for a code value CV, $$L = L_{max} \times \left(\frac{CV}{CV_{max}}\right)^{\gamma}$$

given the maximum allowable pixel luminance $L_{max}$, the maximum allowable code value $CV_{max}$, and the power-law exponent $\gamma$. If a dynamic iris changes size such that one-half of the light is transmitted as before, then the iris is said to have reduced the throughput by one "stop". This reduction in throughput, a, is a global modulation of the image, for example all or approximately all pixels may be reduced in luminance.

$$a = \frac{1}{2^{(no.\ stops)}}$$

$$L = a \times L_{max} \times \left(\frac{CV'}{CV_{max}}\right)^{\gamma}$$

In this example, the black levels become much darker, but the bright pixels also become darker. To compensate for this and to return the levels of the bright pixels back to the intended luminance, the code values in the image must be linearized (de-gamma), scaled by 1/a, and the power law must be reapplied (re-gamma), $$CV' = CV_{max} \times \left(\frac{L/a}{L_{max}}\right)^{\frac{1}{\gamma}}$$

Note that the higher pixel luminance in the image may be less than or equal to $(a \times L_{max})$, otherwise clipping in bright areas of the image may occur. If some clipping is acceptable, the average luminance in the image may be used.

Figure 4A:
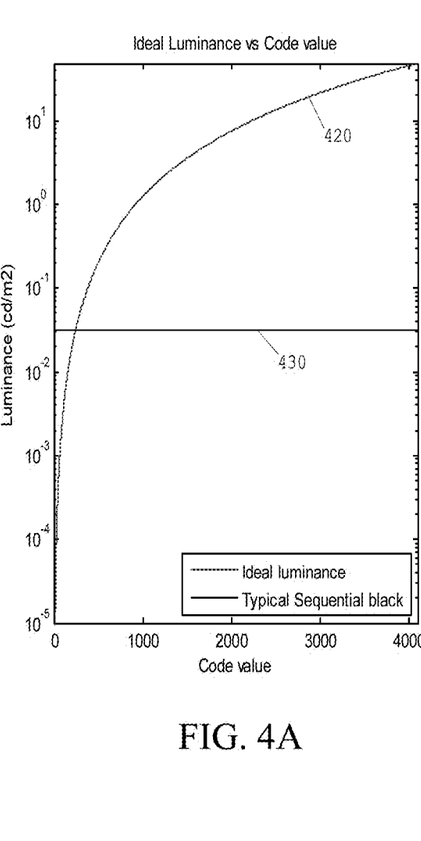
FIG. 4A is a schematic diagram illustrating an ideal luminance curve for code values in a 12 bit system, in accordance with the present disclosure.
Figure 4B:
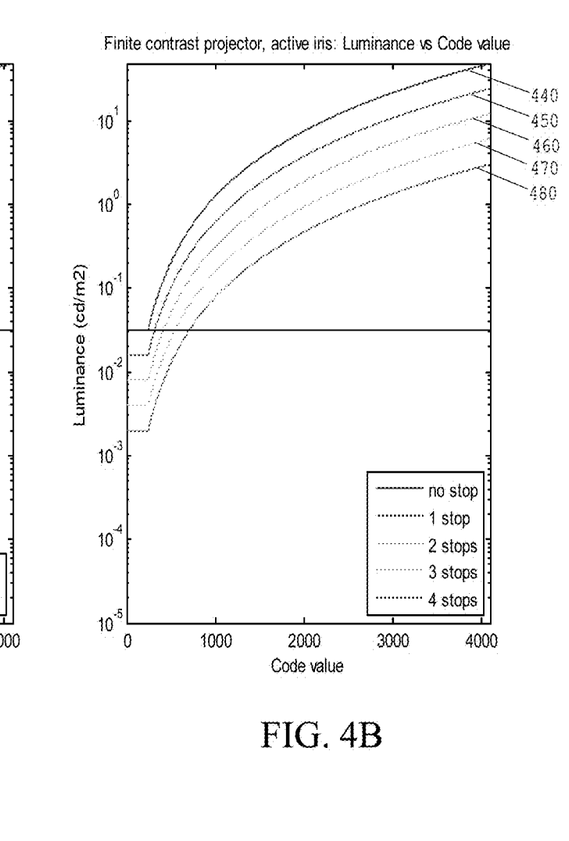
FIG. 4B is a schematic diagram illustrating luminance curves for a finite contrast projector with various stops of dynamic iris, in accordance with the present disclosure.

FIGS. 4A and 4B depict the effect of a dynamic iris on image luminance. FIG. 4A depicts the ideal luminance curve 420 (on a log scale) for code values in a 12-bit gray level system. The horizontal black line 430 in FIG. 4A indicates the luminance level for a typical projector when projecting a fully black image (termed sequential black). Typical sequential contrast ratios for a DLP cinema projector are 2000:1. FIG. 4B depicts luminance curves for a finite contrast projector with various stops of a dynamic iris. Luminance levels below the black line are dark areas recovered in the image that were previously "crushed" by the sequential black level. The code values have been adjusted to CV' values; this makes a wider range of code values available for the same image. Interpolation of luminance values (for the higher range of code values) may be required to reduce contouring effects in the final image. In FIG. 4B, the uppermost curve represents the "no stop" curve 440, the next curve down is the "1 stop" curve 450, the third curve down is the "2 stops" curve 460, the fourth curve from the top is the "3 stops" curve 470, and the bottom curve is the "4 stops" curve 480.

Figure 5A:
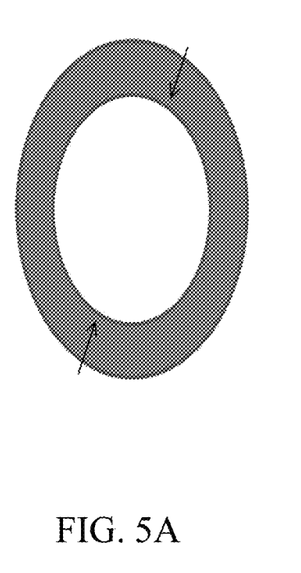
FIG. 5A is a schematic diagram illustrating a dynamic iris shape, in accordance with the present disclosure.
Figure 5B:
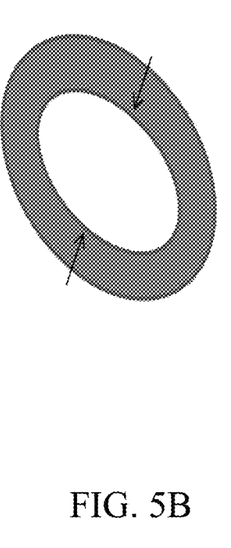
FIG. 5B is a schematic diagram illustrating a dynamic iris shape, in accordance with the present disclosure.
Figure 5C:
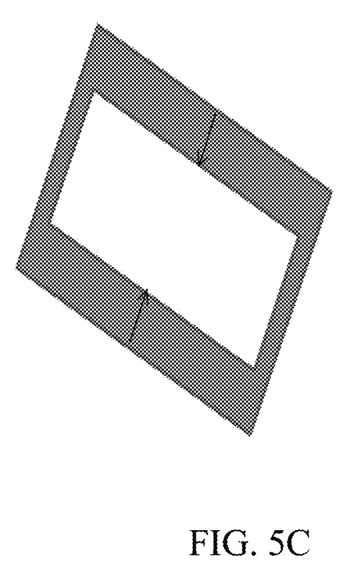
FIG. 5C is a schematic diagram illustrating a dynamic iris shape, in accordance with the present disclosure.

FIGS. 5A, 5B, and 5C are schematic diagrams illustrating different example shapes for a dynamic iris. FIGS. 5A, 5B, and 5C depict three of the many possible shapes for a dynamic iris. A dynamic iris may be various shapes, but is not limited to, the shapes in FIGS. 5A, 5B, and 5C. As pictured from left to right, FIG. 5A depicts an approximately circular iris, FIG. 5B depicts an elliptical or cat-eye iris, and FIG. 5C depicts an approximately rectangular iris. The shape of a dynamic iris may be tilted and/or off-axis to better capture stray light from the DLP panel and illumination system, as generally discussed in a White paper from Texas Instruments, Inc., Plano, Tex., "Advances in Contrast Enhancement for DLP Projection" Jun. 6, 2002. Additionally, one or both sides of an elliptical or rectangular dynamic iris may be adjustable or moveable.

Stereoscopic 3D HDR Projection

The relay and projection lens system of FIG. 3 may be applied to stereoscopic projection. For example, an actively-switched polarization system such as, but not limited to, a ZScreen, may follow the lens system to encode stereoscopic imagery. Alternatively, a passive polarization system may follow the lens in the case where more than one projector is used to encode the imagery. A multi-wavelength approach may be utilized, in which narrow spectral bandwidths may be transmitted through the lens system, and decoded into left and right images with dichroic or thin film interference eyewear. One or more dynamic irises used in such a system may use provisions for determining the modulation values based on image data or metadata.

Polarization-Preserving 3D HDR Projection

One or more dynamic irises may be included in a polarization-preserving stereoscopic projection system. Examples of such systems may include, but are not limited to, the RealD XL, RealD XLW, RealD XLDP, and RealD XLWDP products, as generally discussed in at least U.S. Pat. No. 7,905,602 and U.S. Pat. No. 7,857,455. The RealD XL product may be located after the exit surface of the projection lens, and splits the randomly polarized input light into orthogonal polarization states. The product may then redirect and/or manipulate the light to produce approximately matching polarization states, and may overlay the two light paths on-screen for viewing. In one example, a relay and projection lens system with dynamic iris may be located before the polarizing beam splitter (PBS) in the XL product, thus light entering the polarization modulators may be polarized and the system efficiency may remain high. Such a dynamic iris may be, for example, an electro-mechanical iris with an adjustment response time on the order of a frame period.

Figure 6:
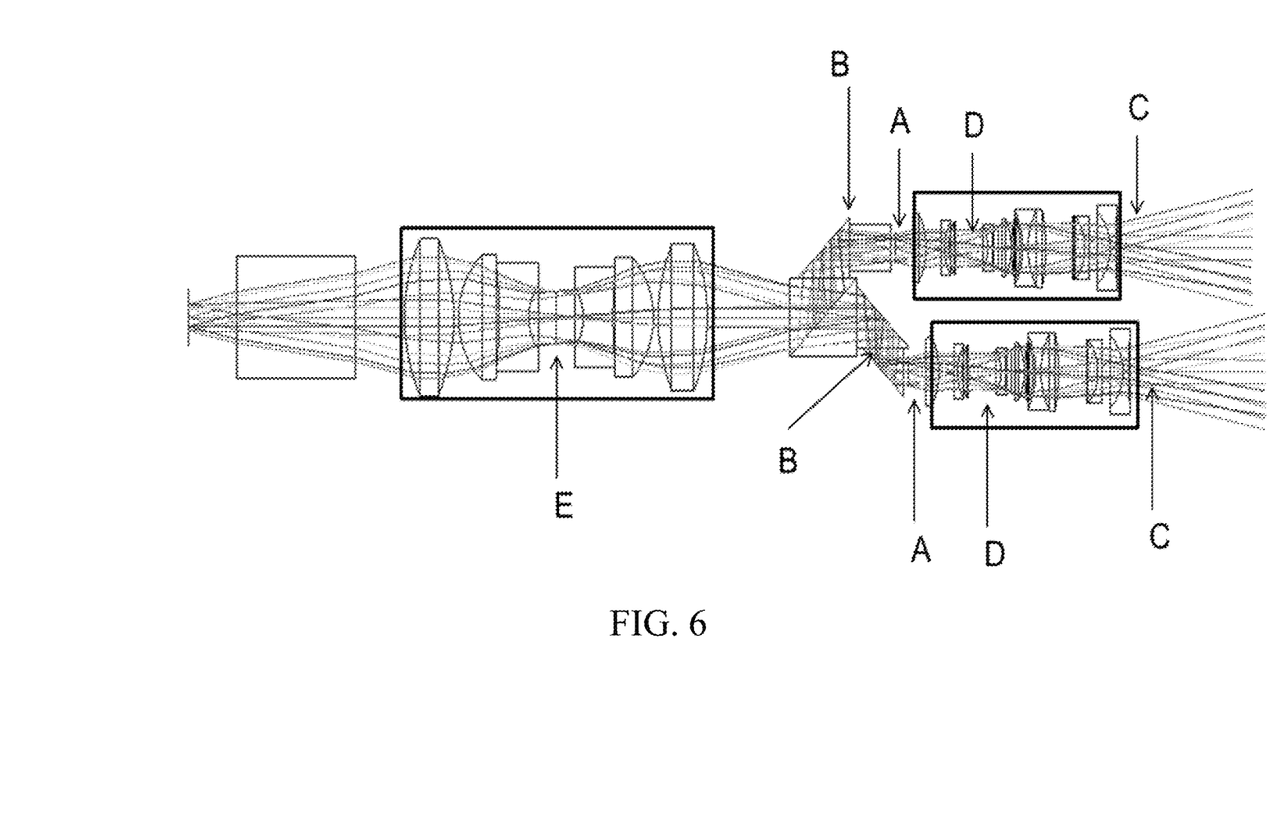
FIG. 6 is a schematic diagram illustrating an example polarization preserving stereoscopic system with dynamic iris, in accordance with the present disclosure.

3D systems in which the polarization-preserving function may be located in the object conjugate of the projection lens is generally discussed in U.S. Pat. No. 9,244,287 entitled "Optical systems with compact back focal lengths," which is herein incorporated by reference in its entirety. In such cases, a relay lens creates a real intermediate image of the display, and a polarizing beam splitter and one or more reflecting surfaces direct approximately orthogonal polarization states to two projection lenses. FIG. 6 depicts such a system.

FIG. 6 is a schematic diagram illustrating dynamic iris location options for a polarization-preserving stereoscopic system. A dynamic iris may be located at any or all of locations D and E, near the aperture stops or pupil positions of the relay and/or projection lenses. Such a dynamic iris may be, for example, an electro-mechanical iris with an adjustment response time on the order of a frame period. Other HDR modulators, either global or pixelated, may be included in this system, at one or more of the locations A, B, and C, which may be positions between a pupil and field. A high resolution spatial light modulator may provide light to a relay lens system which may include a dynamic iris at location E. In some embodiments, the high resolution spatial light modulator may be a 4K digital light processing projection system.

The image impinging on the screen represents the superposition of light from the S and P paths of the XL unit. Assuming an unpolarized input, these images have very nearly the same amplitude. Since the eye averages the chrominance and luminance from each path, some compensation can be done to mitigate the voltage dependent color of the modulator. Assume, for example, that pi-cells are used as the modulator, which are zero-order variable retarders. If one path of the XL unit is given by a liquid crystal variable retarder between parallel polarizers, with the other given by a variable retarder between crossed polarizers, voltage lookup tables can be selected to mitigate chromatic effects. Note that the former has relatively low dynamic range in the half-wave state, but overall dynamic range may be sufficient for most applications.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An optical lens system having an imaging path, the optical lens system comprising:

a relay lens system in the imaging path, the relay lens configured to receive an image data stream, the image data stream comprising a sequence of image frames, the image data stream having an image frame period;

a projection lens system in the imaging path, the projection lens system configured to receive the image data stream from the relay lens system; and a dynamic iris in the imaging path, the dynamic iris comprising an aperture having a size, the dynamic iris configured to change the size of the aperture at a rate at least as fast as the image frame period, the dynamic iris further configured to modulate a first image frame in the image data stream, the modulating resulting in a reduction in light transmission associated with the first image frame, wherein the dynamic iris is located within the relay lens system.

2. The optical lens system of claim 1, wherein the projection lens system comprises a pupil that changes diameter with focal length.

3. The optical lens system of claim 1, further comprising:
a second dynamic iris in the imaging path, the second dynamic iris located within the projection lens system, the second dynamic iris configured to further modulate the first image frame, the further modulating resulting in a further reduction in light transmission associated with the first image frame.

4. The optical lens system of claim 1, wherein the modulating is based on an electronic preview of the first image frame.

5. The optical lens system of claim 1, wherein the modulating is based on metadata associated with the first image frame.

6. The optical lens system of claim 1, wherein the dynamic iris has a shape, and wherein the shape is selected from the group consisting of a circular shape, an elliptical shape, and a rectangular shape.

7. A polarization conversion system, comprising:
a first lens system on an initial light path, the first lens system configured to receive an image data stream, the image data stream comprising a sequence of image frames, the image data stream having an image frame period;

a light splitting element configured to receive the image data stream as randomly polarized image light from the first lens system, the light splitting element further configured to direct light with a first polarization state along a first light path, and further configured to direct light with a second polarization state along a second light path;

a reflecting element located on the second light path and configured to receive light from the light splitting element;

a polarization rotator element located on the second light path and configured to receive reflected light from the reflecting element;

a second lens system configured to receive the image data stream on the first light path from the light splitting element;

a third lens system configured to receive the image data stream on the second light path from the polarization rotator element; and a dynamic iris in a light path selected from the group consisting of the initial light path, the first light path, and the second light path, the dynamic iris comprising an aperture having a size, the dynamic iris configured to change the size of the aperture at a rate at least as fast as the image frame period, the dynamic iris further configured to modulate a first image frame in the image data stream, the modulating resulting in a reduction in light transmission associated with the first image frame.

8. The polarization conversion system of claim 7, wherein the light path is the initial light path, and wherein the dynamic iris is located within the first lens system.

9. The polarization conversion system of claim 8, further comprising:
a second dynamic iris in the first light path, the second dynamic iris located within the second lens system, the second dynamic iris configured to further modulate the first image frame on the first light path, the further modulating resulting in a further reduction in light transmission associated with the first image frame on the first light path; and a third dynamic iris in the second light path, the third dynamic iris located within the third lens system, the second dynamic iris configured to further modulate the first image frame on the second light path, the further modulating resulting in a further reduction in light transmission associated with the first image frame on the second light path.

10. The polarization conversion system of claim 7, wherein the light path is selected from the group consisting of the first light path and the second light path, and wherein the dynamic iris is located within a lens system selected from the group consisting of the second lens system and the third lens system.

11. The polarization conversion system of claim 10, wherein the light path is the first light path and wherein the dynamic iris is located within the second lens system, the polarization conversion system further comprising:
a second dynamic iris in the second light path, the second dynamic iris located within the third lens system, the second dynamic iris configured to modulate the first image frame on the second light path, the modulating resulting in a reduction in light transmission associated with the first image frame on the second light path.

12. The polarization conversion system of claim 7, wherein the first lens system comprises a first lens pupil, wherein the second lens system comprises a second lens pupil, wherein the third lens system comprises a third lens pupil, and wherein the dynamic iris is located near a pupil selected from the group consisting of the first lens pupil, the second lens pupil, and the third lens pupil.

13. The polarization conversion system of claim 7, wherein the modulating is based on an electronic preview of the first image frame.

14. The polarization conversion system of claim 7, wherein the modulating is based on metadata associated with the first image frame.

15. An optical lens system having an imaging path, the optical lens system comprising:
a relay lens system in the imaging path, the relay lens configured to receive an image data stream, the image data stream comprising a sequence of image frames, the image data stream having an image frame period;

a projection lens system in the imaging path, the projection lens system configured to receive the image data stream from the relay lens system; and a dynamic iris in the imaging path, the dynamic iris comprising an aperture having a size, the dynamic iris configured to change the size of the aperture at a rate at least as fast as the image frame period, the dynamic iris further configured to modulate a first image frame in the image data stream, the modulating resulting in a reduction in light transmission associated with the first image frame, wherein the relay lens system comprises a relay lens pupil, wherein the projection lens system comprises a projection lens pupil, and wherein the dynamic iris is located near a pupil selected from the group consisting of the relay lens pupil and the projection lens pupil.

16. The optical lens system of claim 15, wherein the dynamic iris is located at the pupil.

17. An optical lens system having an imaging path, the optical lens system comprising:
- a relay lens system in the imaging path, the relay lens configured to receive an image data stream, the image data stream comprising a sequence of image frames, the image data stream having an image frame period;
- a projection lens system in the imaging path, the projection lens system configured to receive the image data stream from the relay lens system; and
- a dynamic iris in the imaging path, the dynamic iris comprising an aperture having a size, the dynamic iris configured to change the size of the aperture at a rate at least as fast as the image frame period, the dynamic iris further configured to modulate a first image frame in the image data stream, the modulating resulting in a reduction in light transmission associated with the first image frame, wherein the first image frame comprises a set of pixels, each pixel having a pixel luminance encoded according to a power-law expression based on code values, and wherein after the modulating, the code values are linearized, scaled inversely by the reduction in light transmission, and the power-law expression is reapplied.

18. An optical lens system having an imaging path, the optical lens system comprising:
- a relay lens system in the imaging path, the relay lens configured to receive an image data stream, the image data stream comprising a sequence of image frames, the image data stream having an image frame period;
- a projection lens system in the imaging path, the projection lens system configured to receive the image data stream from the relay lens system; and
- a dynamic iris in the imaging path, the dynamic iris comprising an aperture having a size, the dynamic iris configured to change the size of the aperture at a rate at least as fast as the image frame period, the dynamic iris further configured to modulate a first image frame in the image data stream, the modulating resulting in a reduction in light transmission associated with the first image frame, wherein the dynamic iris is an electro-mechanical iris.

19. The optical lens system of claim 18, wherein the dynamic iris is located within the projection lens system.

20. The optical lens system of claim 18, wherein the dynamic iris has a shape, and wherein the shape is selected from the group consisting of a circular shape, an elliptical shape, and a rectangular shape.

\* \* \* \* \*